(12) United States Patent
Anderson et al.

(10) Patent No.: US 7,164,118 B2
(45) Date of Patent: Jan. 16, 2007

(54) METHOD AND SYSTEM FOR OBSTACLE DETECTION

(75) Inventors: Noel Wayne Anderson, Fargo, ND (US); Jeffrey Scott Puhalla, Hawley, MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/977,173

(22) Filed: Oct. 29, 2004

(65) Prior Publication Data

US 2006/0091297 A1    May 4, 2006

(51) Int. Cl.
G06M 7/00 (2006.01)
G01B 11/24 (2006.01)

(52) U.S. Cl. .................. 250/221; 356/603; 356/604

(58) Field of Classification Search ............. 250/221, 250/559.28, 559.38, 206.1; 356/620, 622, 356/314, 603, 604
See application file for complete search history.

(56) References Cited

U.S. PATENT DOCUMENTS

| | | | | |
|---|---|---|---|---|
| 4,317,992 | A * | 3/1982 | Stauffer ...................... | 250/221 |
| 4,335,962 | A * | 6/1982 | Di Matteo et al. .......... | 356/604 |
| 5,040,116 | A | 8/1991 | Evans, Jr. et al. ...... | 364/424.02 |
| 5,705,807 | A * | 1/1998 | Throngnumchai et al. ....................... | 250/214 P |
| 6,204,755 | B1 * | 3/2001 | Kikuchi ...................... | 340/435 |
| 6,246,949 | B1 * | 6/2001 | Shirai et al. .................. | 701/96 |
| 2002/0190195 | A1 * | 12/2002 | O'Connor et al. .......... | 250/221 |
| 2003/0075675 | A1 * | 4/2003 | Braune et al. .............. | 250/221 |
| 2003/0222812 | A1 * | 12/2003 | Kishida ...................... | 342/109 |
| 2004/0001197 | A1 | 1/2004 | Ko et al. ................. | 356/152.1 |
| 2004/0056182 | A1 * | 3/2004 | Jamieson et al. ........... | 250/221 |
| 2004/0066500 | A1 | 4/2004 | Gokturk et al. ............ | 356/4.01 |
| 2004/0155177 | A1 * | 8/2004 | Schmitt ...................... | 250/221 |

FOREIGN PATENT DOCUMENTS

| | | |
|---|---|---|
| DE | 197 52 145 | 5/1999 |
| EP | 0 361 188 | 4/1990 |
| WO | WO 9013103 A1 * | 11/1990 |
| WO | 92/11508 | 7/1992 |
| WO | 99/46612 | 9/1999 |
| WO | 2004/044525 | 5/2004 |

OTHER PUBLICATIONS

C. Mertz, J. Kozar, J.R. Miller, C. Thorpe; Eye-sage Laser Line Striper for Outside Use; Carnegie Mellon University Intelligent Vehicle Symposium Jun. 2002, Dec. 2001.

Matthies, L.; Balch, T.; and Wilcox, B. *Fast Optical Hazard Detection for Planetary Rovers Using Multiple Spot Laser Triangulation*. Proceedings of the 1997 IEEE International Conference on Robotics and Automation, pp. 859-866, Apr. 1997, Albuquerque, NM, USA.

(Continued)

*Primary Examiner*—Georgia Epps
*Assistant Examiner*—Brian Livedalen

(57) ABSTRACT

A method and system for detecting the presence of an object or the distance between the system and an object supports the provision of rapid and reliable obstacle detection. A transmitter emits generally linear beams of electromagnetic radiation with a transmitted radiation pattern within a defined spatial zone. A camera collects an image of the defined spatial zone. A data processor detects a presence of an object in the collected image based on an observed illumination radiation pattern on an object formed by at least one of the generally linear beams. A distance estimator estimates a distance between the object and the optical device based on a change (e.g., an observed shift in one or more positions of generally linear beams) from the transmitted radiation pattern to the observed illumination radiation pattern.

30 Claims, 10 Drawing Sheets

OTHER PUBLICATIONS

Pears, N. and Probert, P. *Active Triangulation Rangefinder Design for Mobile Robots*. Proceedings of the 1992 IEEE/RSJ International Conference on Intelligent Robotics and Systems, pp. 2047-2052, Jul. 7-10, 1992, Raleigh, NC, USA.

* cited by examiner

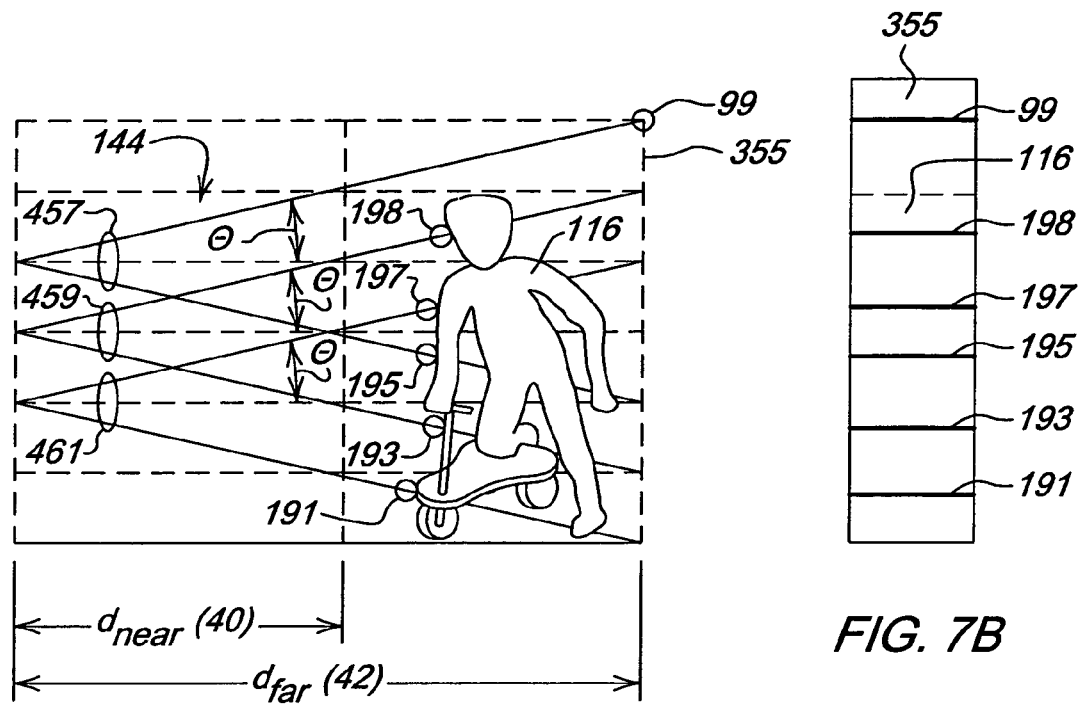
*FIG. 7A*
*FIG. 7B*
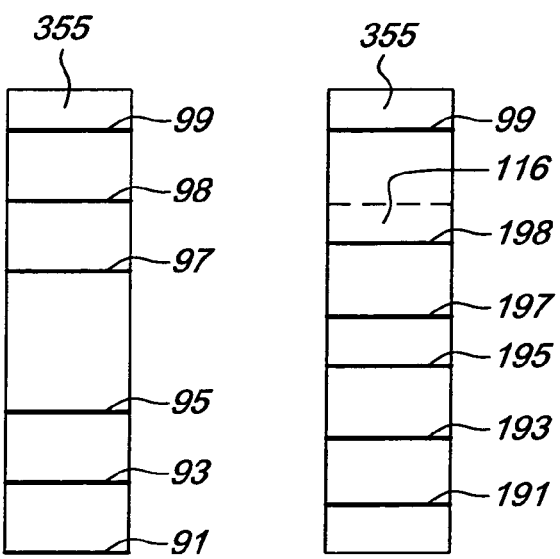
*FIG. 8A*     *FIG. 8B*

METHOD AND SYSTEM FOR OBSTACLE DETECTION

FIELD OF THE INVENTION

This invention relates to a method and system for obstacle detection for a vehicle.

BACKGROUND OF THE INVENTION

In the prior art, scanning lasers may use mechanical components (e.g., a mirror or other movable member) to scan a beam over a field of view. The mechanical components may require the scanning laser to cycle through an entire range of beam orientations, rather than supporting random access to any particular orientation of the scanning beam. For obstacle detection applications of a vehicle, the response time for collecting image data should be rapid over a wide field of view to facilitate early recognition and avoidance of obstacles.

Although micro-electromechanical systems may be applied to improve reliability and improve the response time of the scanning lasers, the cost of micro-mechanical systems may not be appropriate for some applications. Further, because a micro-electromechanical system may generate multiple lines of light from a common source, the intensity of the light near the source may exceed a target level (e.g., a desired safety level). For the foregoing reasons, there is a need for an economical, safe, rapid and reliable method and system for obstacle detection.

SUMMARY OF THE INVENTION

A method and system for obstacle detection facilitates rapid and reliable detection of an object and/or estimation of a distance between the system and the object. A transmitter emits generally linear beams of electromagnetic radiation with a transmitted radiation pattern within a defined spatial zone. A camera collects one or more images of the defined spatial zone. A data processor detects a presence of an object in the collected image based on an observed illumination radiation pattern on an object formed by at least one of the generally linear beams. A distance estimator estimates a distance between the object and the camera based on a material change (e.g., an observed shift in one or more positions) of the generally linear beams from the transmitted radiation pattern to the observed illumination radiation pattern.

BRIEF DESCRIPTION OF THE DRAWINGS

FIG. 7A is a transmitted radiation pattern (as viewed in the vertical plane) that illuminates at least a portion of an obstacle or object.

FIG. 7B is a second illumination radiation pattern that strikes an obstacle and a wall or generally planar surface behind the obstacle consistent with the transmitted radiation pattern of FIG. 7A.

FIG. 8A and FIG. 8B collectively form a side-by-side comparison of a first illumination pattern of FIG. 6B and a second illumination pattern of FIG. 7B, respectively.

FIG. 11 is a top view of the work vehicle that includes a set of radiation patterns for an obstacle detection system that comprises a primary radiation pattern, a secondary radiation pattern and a tertiary radiation pattern.

Like reference numbers in different drawings indicate like elements.

DESCRIPTION OF THE PREFERRED EMBODIMENT

Figure 1:
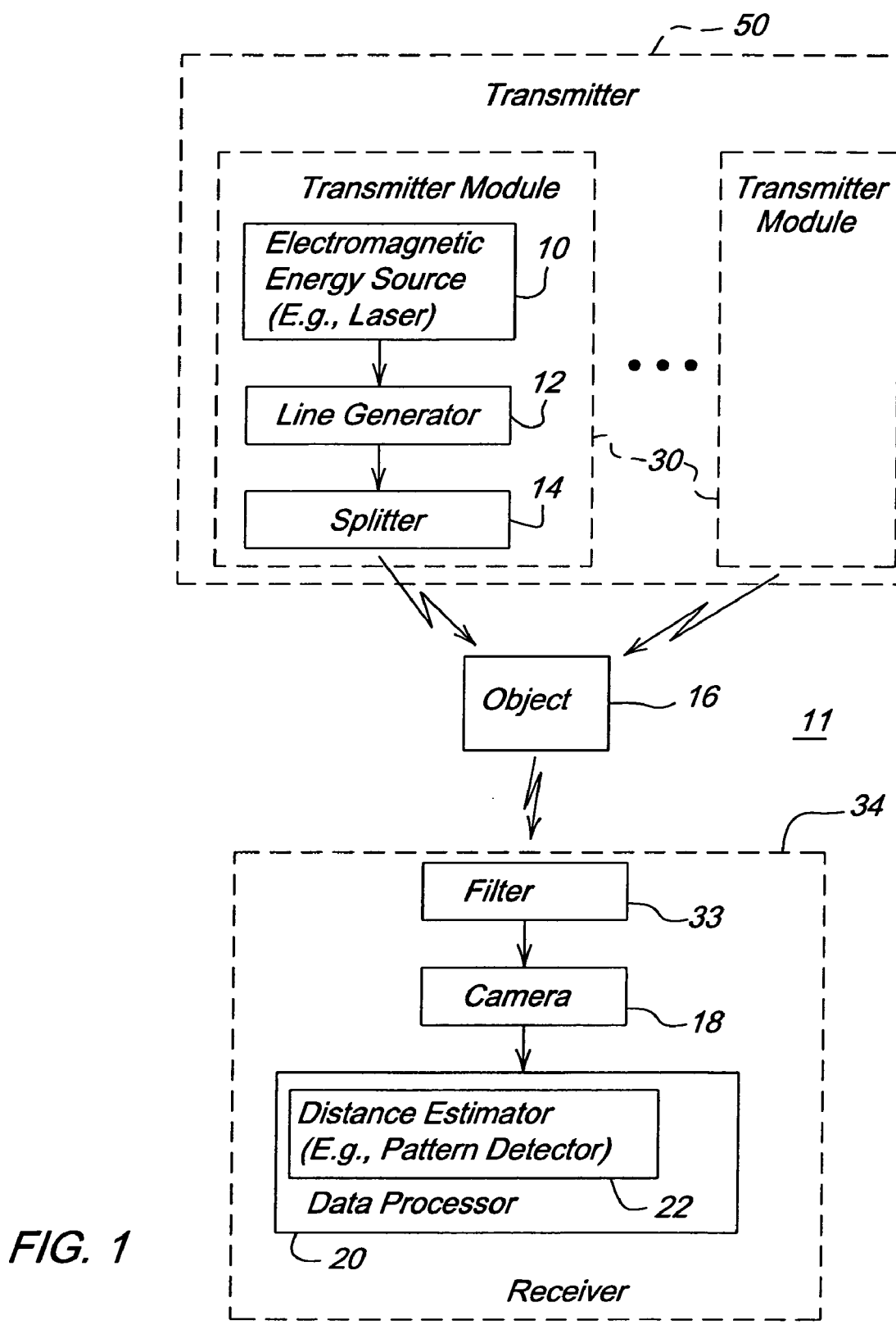
FIG. 1 is a block diagram of one embodiment of an obstacle detection system in accordance with the invention.

In accordance with one embodiment of the invention, FIG. 1 is a block diagram of an obstacle detection system 11. One or more objects 16 or obstacles of a given size in a field of regard must be known with sufficient temporal resolution to enable safe passage of a vehicle at a given speed, acceleration, and heading. The obstacle detection system 11 comprises a transmitter 50 and a receiver 34. The transmitter (e.g., 50) and the receiver (e.g., 34) may collectively be referred to as an optical device or optical unit herein. The transmitter 50 further comprises a group of transmitter modules 30 (e.g., a laser line emitters).

Each transmitter module 30 includes an electromagnetic energy source 10 (e.g., a laser) that provides electromagnetic energy (e.g., light, ultraviolet light or infrared radiation) to a line generator 12. For example, the electromagnetic energy source 10 may provide a generated beam, a columnar beam or another input beam of electromagnetic energy to the line generator 12. The line generator 12 accepts the input beam and outputs a generally linear segment or strip. An output of the line generator 12 is coupled to the splitter 14. The splitter 14 splits or divides the generally linear segment or strip into two or more linear segments or strips that are generally parallel to one another or diverge from one another at known angles. In one illustrative example, an upper linear segment makes an upper angle with respect to a generally horizontal plane, and a lower segment makes a lower angle with respect to the generally horizontal plane. The upper angle may equal, but does not need to equal, the lower angle.

Each transmitter module 30 may be spaced apart from other transmitter modules 30 such that an aggregate radiation pattern is produced that consists of a series of generally parallel lines spaced vertically apart by known amounts from each other. Advantageously, the stacking of multiple transmit modules 30 along the vertical height of the vehicle allows the vehicle to detect obstacles of various heights in the path of the vehicle, including obstacles lying on the ground or near the ground plane, obstacles at a higher horizontal plane, and obstacles that are in an intermediate horizontal plane between the ground plane and the higher horizontal plane. The higher horizontal plane may be equal to or greater than a maximum height of the vehicle, for instance. An example of an obstacle lying in an intermediate horizontal plane might be a cable or wire (in the path of the vehicle) that is suspended in space between two poles or supports.

In one embodiment, the laser line emission points or their corresponding transmitter modules 30 are distributed vertically along the vehicle for several reasons: (1) the number of transmitted lines of a radiation pattern to cover the full field of regard is minimized, (2) eye safety issues are reduced by not having electromagnetic radiation (e.g., all light) emitted from a single point or concentrated source, (3) the system 11 may be more reliable since the failure of a single emission point or transmitter module 30 may still allow the vehicle to continue operating at a slower speed, while avoiding obstacles in a less robust manner (e.g., potentially missing the detection of obstacles associated with the failed emission points).

The transmitter 50 may pulse the entire aggregate radiation pattern or components (e.g., line segments or strips) of the radiation pattern to enhance eye safety and reduce power consumption. The transmitter 50 transmits the aggregate radiation pattern (or components thereof) toward an object 16 or obstacle. Although the aggregate radiation pattern may form a generally triangular shape in a horizontal plane, the radiation pattern may have any other shape in the horizontal plane as viewed from the top.

The receiver 34 receives a reflection from the object 16 or obstacle or captures an illumination radiation pattern incident on the object 16 or obstacle. The receiver 34 comprises a filter 33 that filters received electromagnetic radiation (e.g., the illumination radiation pattern) in a field of view on a frequency-selective basis. The filter 33 is optically coupled to a camera 18. Although the filter 33 may comprise a bandpass filter 33 tuned to the same frequency as one or more transmitter modules 30, the filter 33 may have a band-reject frequency response, a notch frequency response, or any other suitable filtering frequency versus magnitude (e.g., relative signal amplitude in decibels) response. The camera 18 may comprise a detector, such as a charge-coupled device (CCD), a complementary metal-oxide semiconductor (CMOS) image array, a shutter-controlled aperture, and memory for storing images. The camera 18 has a sufficient number of pixels (e.g., greater than or equal to 1 megapixels) to meet the minimum obstacle size observation requirement (if any)(e.g., greater than or equal to 0.1 meter) within the filed of regard. The camera 18 has a short enough image capture time (e.g., 20 Hz sampling rate for the images) to minimize blurring from motion. Further the camera 18 may provide one or more stored images to a data processor 20.

Figures 6A, 6B:
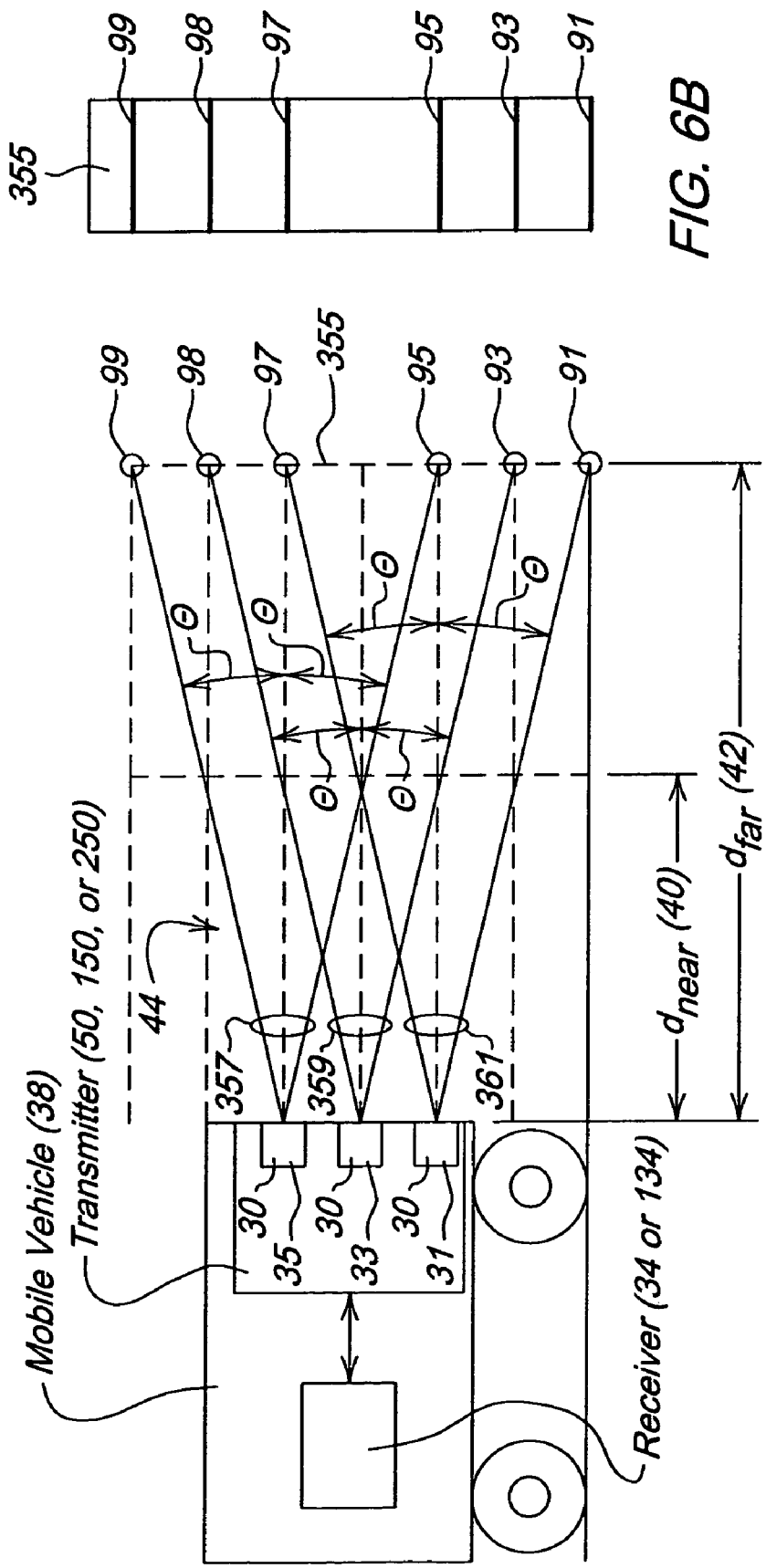
FIG. 6A is a side view of a mobile vehicle (equipped with an obstacle detection system) transmitting a radiation pattern (as viewed in the vertical plane) comprising a group of generally linear segments that are generally parallel to one another.
FIG. 6B is a first illumination radiation pattern that strikes a generally planar surface (e.g., a wall) at a known distance with respect to the mobile vehicle, consistent with the transmitted radiation pattern of FIG. 6A.

The data processor 20 may comprise a distance estimator 22 for estimating a distance of the object 16 from the receiver 34, which is mounted on a work vehicle. For example, the distance estimator 22 may comprise a pattern detector for detecting a pattern of the illumination radiation pattern or a shift in the observed illumination radiation pattern with respect to a reference illumination radiation pattern. The data processor 20 has sufficient processing capacity or throughput to process one or more images quickly enough so that obstacle detection system can gather enough images to meet the obstacle detection requirement within the field of regard. In one embodiment, the reference illumination radiation pattern represents an illumination radiation pattern that is present when the transmitter 50 with known positional coordinates (e.g., x, y and z coordinates) transmits the aggregate radiation pattern toward a wall or generally planar surface that is spaced apart from the transmitter 50 by a known distance and orientation. Because each generally linear radiation beam, each segment or strip has an upper angle and a lower angle with respect to a generally horizontal plane, the relative position of each line of the generally linear radiation pattern with respect to the reference radiation pattern reveals the location of an obstacle in front of the vehicle within a certain maximum range. As shown in FIG. 6A, which is considered in conjunction with FIG. 1 here, the beams spread out from each transmission module 30 or emission point at a symmetric angle to the horizontal axis. The upper transmission angle ($\theta$) and the lower transmission angle ($\theta$) added together form a beam angle (e.g., $2\theta$). The beam angle and the horizontal plane fan-out width are related to the specified minimum obstacle size and the image capture rate of the receiver 34 (or camera 18) such that in a first zone between $d_{near}$ (40) and $d_{far}$ (42), any obstacle greater in size than the specified minimum size will be observed breaking the laser light plane in one of the images captured by the receiver 34.

The intensity of the transmitted lines (e.g. laser lines) are either safe for human vision or are operated in areas where people must wear optical filtering glasses or other eye protection to attenuate the frequency of the transmitted lines. The transmitter 50 transmits with a transmission power that is sufficient or powerful enough to generate a reflection from dark surfaces encountered up to a distance $d_{far}$ (42) from the vehicle. The line width of the radiation pattern is adequate for the detection of obstacles breaking the line.

In FIG. 1, consistent with the environment around the vehicle, the transmitter 50 needs to produce an adequate number of laser lines with a specified thickness, intensity, horizontal fan-out, and vertical inclination or declination to ensure that an obstacle approaching the vehicle will perturb at least one of the laser lines for a sufficiently long interval to be observed by the camera 18 while the obstacle is in the field of regard. The receiver 34 and processor must have a sufficient number of pixels, a short enough image capture time, and a short enough image processing time to sample and process laser line perturbations in the field of regard in real time.

Unless a wall or ceiling is present, upwardly directed lines of the transmitted radiation pattern are likely to fall outside the field of view of the camera 18. If the near, downward directed lines are not visible in the field of view of the camera 18 and if such downward directed lines are expected to be visible, a nonreflective or dark obstacle may be present or a negative obstacle may be present. A negative obstacle refers to a hole, a depression in the terrain, a staircase or a stairwell in a building, for example. A hole depression, or stairwell may not reflect light transmitted by the transmitter 50 to the same extent as flat ground or a generally planar floor, for example.

Figure 2:
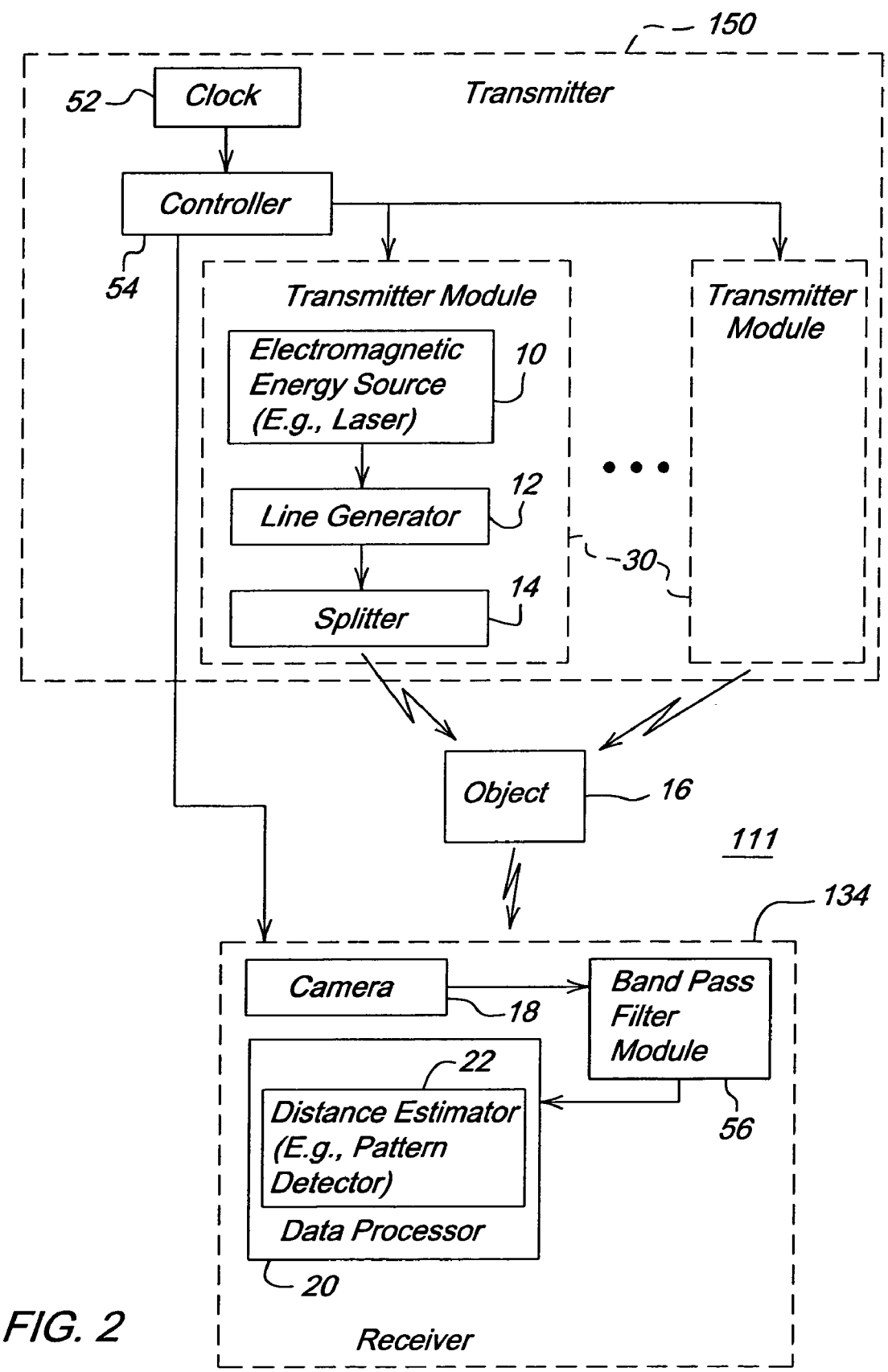
FIG. 2 is a block diagram of another embodiment of an obstacle detection system in accordance with the invention.

The obstacle detection system 111 of FIG. 2 is similar to the obstacle detection system 11 of FIG. 1, except the obstacle detection system 111 of FIG. 2 comprises a transmitter 150 and a receiver 134 instead of transmitter 50 and receiver 34, respectively. Like reference numbers in FIG. 1 and FIG. 2 indicate like elements.

The transmitter 150 of FIG. 2 comprises a clock 52 coupled to a controller 54. In turn, the controller 54 is coupled to a group of transmitter modules 30 and the receiver 134. The controller 54 may control the time and duration of transmissions from one or more transmitter modules 30. For example, the controller 54 may stagger temporally the transmission of electromagnetic radiation from each transmitter module 30 to reduce the aggregate instantaneous output of the transmitter 50 and to enhance eye safety. In one embodiment, the controller 54 may cause the transmitter 50 to transmit pulses, rather than to continuously transmitting. Although the transmitter modules 30 may transmit electromagnetic radiation (e.g., laser light) continuously, a controller 54, data processor, a logic circuit may be used to pulse the transmit modules.

The receiver 134 communicates with the controller 54, the clock 52 or both of the transmitter 150 to determine a reception time window for receiving the transmitted electromagnetic signal of the transmitter 150. As illustrated in FIG. 2, the transmitter 150 includes a band pass filter module 56 coupled between the camera 18 and the data processor 20. The band pass filter module 56 may filter stored image data in the digital domain to be frequency selective of the transmitted radiation pattern. For example, if each transmitter module 30 transmits at a different frequency of electromagnetic radiation simultaneously or serially, the band pass filter module 56 may be dynamically changed or adjusted to isolate the contribution of each transmitter module 30 or emission source to the illumination radiation pattern.

In an alternate embodiment, the receiver 134 of FIG. 2 may be replaced by the receiver 34 of FIG. 1. In another alternate embodiment, both the filter 33 and the band pass filter module 56 may be incorporated into the receiver 134.

Figure 3:
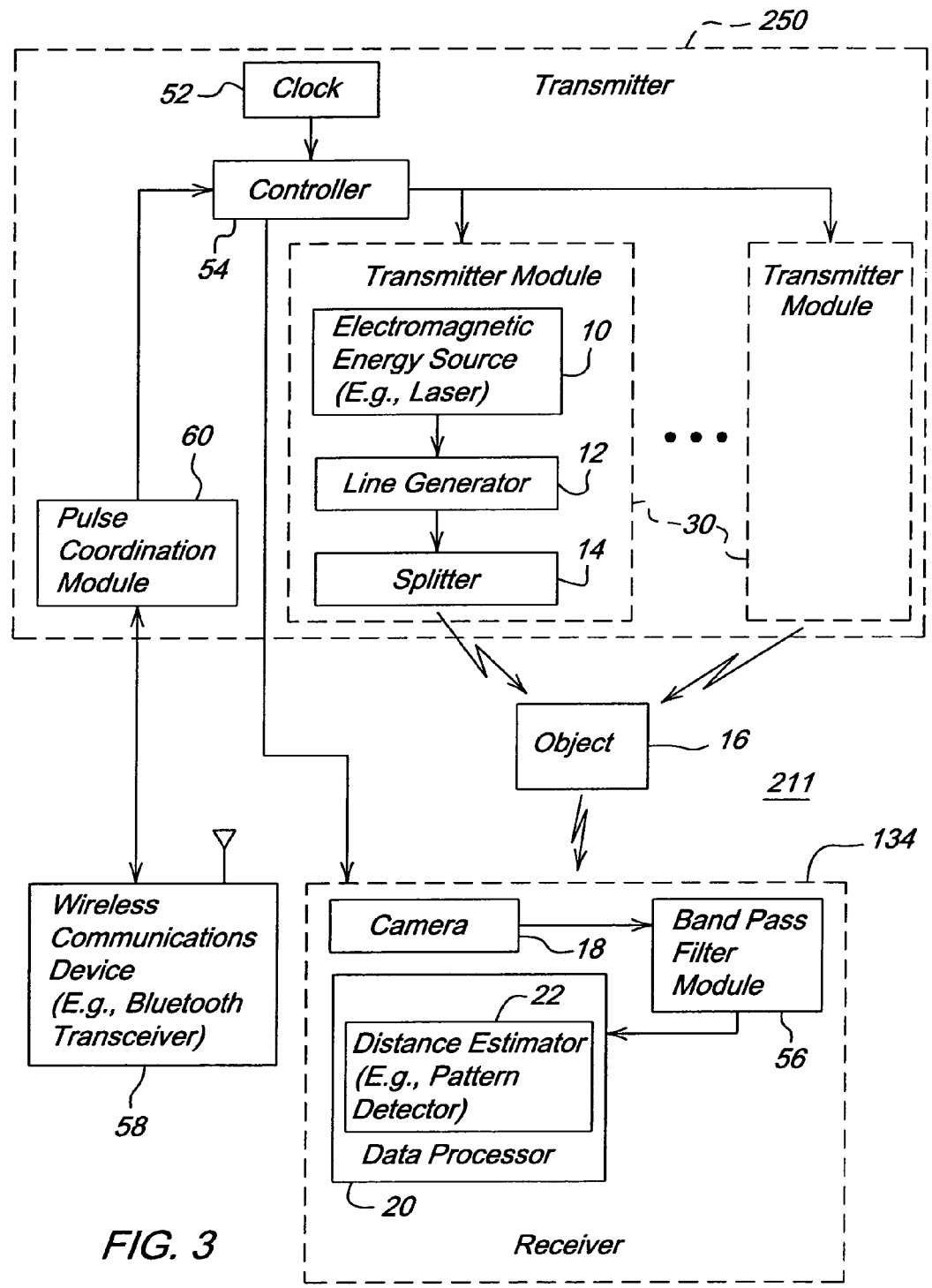
FIG. 3 is yet another embodiment of an obstacle detection system in accordance with the invention.

The obstacle detection system 211 of FIG. 3 is similar to the obstacle detection system 111 of FIG. 2, except the obstacle detection system 211 of FIG. 3 further includes a pulse coordination module 60 and a wireless communications device 58. The wireless communications device 58 is coupled to the pulse coordination module 60. Like reference numbers in FIG. 2 and FIG. 3 indicate like elements.

The wireless communications device 58 is arranged to receive an electromagnetic status signal from other work vehicles or robots in a geographic area to coordinate obstacle detection. For example, assume that multiple work vehicles in a geographic area have an architecture similar to that of FIG. 3 for an obstacle detection system 211. When the controller 54 seeks to command one or more transmitter modules 30 to transmit electromagnetic radiation (e.g., optical energy or laser light), the controller 54 may use the wireless communications device 58 to first listen or scan for the status signal (e.g., radio frequency signal or microwave signal) of other work vehicles to determine whether or not the transmitter 50 of another work vehicle is currently transmitting in the geographic area. If another transmitter 50 of another work vehicle is currently transmitting (e.g., optical energy or laser light) in the geographic area (e.g., within a optical communications range or up to several kilometers), the pulse coordination module 60 may delay transmission of (e.g., optical energy or laser light) to the other work vehicle to avoid interference or an aggregate level of transmission of electromagnetic energy that may otherwise exceed safe human eye levels, safety standards or regulations. However, if another transmitter 50 of another vehicle is not currently transmitting, the controller 54 is permitted to command the transmitter 50 to transmit and the pulse coordination module 60 sends a busy status or transmission-in-progress status signal to prevent other vehicles from interfering with the transmission or exceeding a target maximum eye safety level.

In one embodiment, when multiple work vehicles are operating near each other, erroneous observations may be eliminated by giving each vehicle a time slice in which it can pulse its lasers and capture an image. The time slice coordination may be accomplished over a wireless communications device 58 (e.g., in accordance with Bluetooth, 802.11b, or another communications standard or protocol).

In another embodiment, when vehicles are within communications range of each other, each vehicle's location and pose information is exchanged with the other vehicles via the wireless communication devices 58. Each vehicle can negotiate a time slot of one or more time windows to use and synchronize its time slot. The link between a wireless communications device 58 may also be used to share mapping information, particularly if the vehicles are in an exploratory mode.

Figure 4:
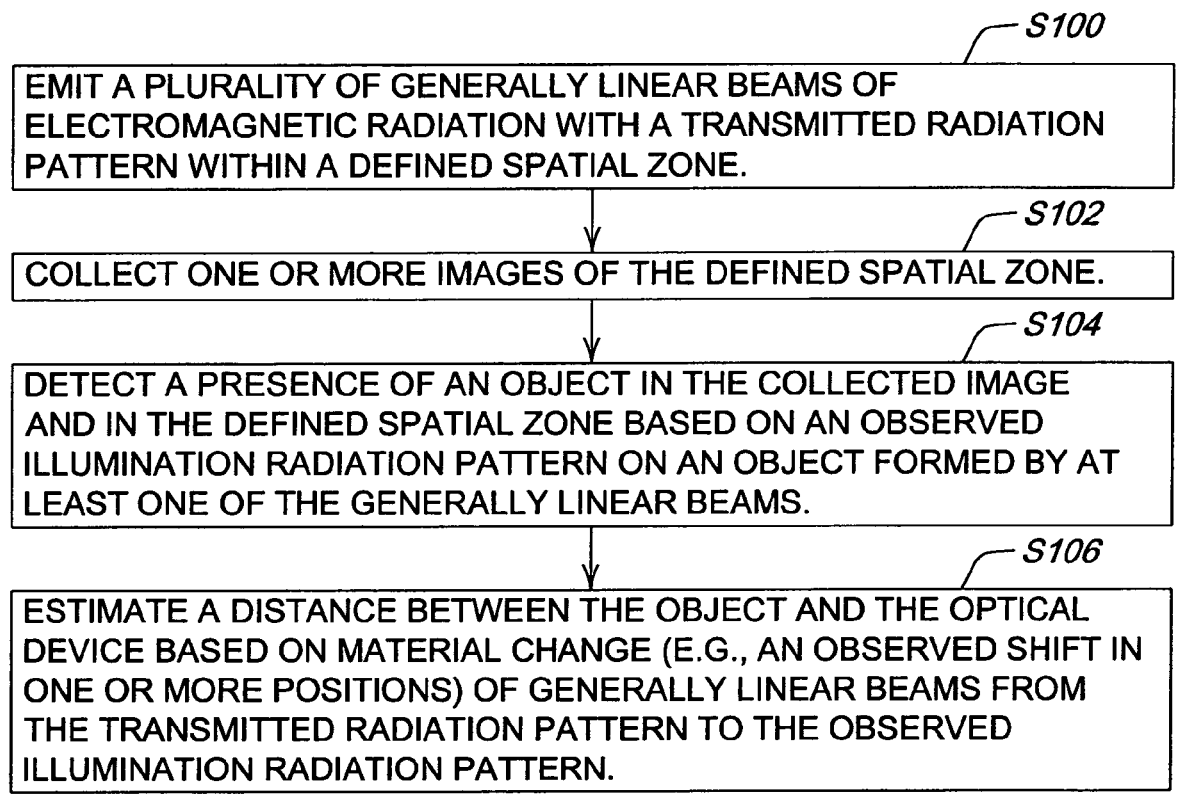
FIG. 4 is flow chart of one embodiment of a method for detecting an obstacle.

FIG. 4 is a flow chart of a method for detecting an obstacle. The method of FIG. 4 begins in step S100.

In step S100, a transmitter (e.g., 50, 150, or 250) emits a plurality of generally linear beams of electromagnetic radiation with a transmitted radiation pattern within a defined spatial zone. The electromagnetic radiation may be transmitted over a certain frequency range, such as visible light, a portion of the visible light spectrum, infra-red light, a portion of the infra-red light spectrum, ultraviolet light, a portion of the ultra-violet light spectrum, or any combination of the foregoing frequency ranges. Step S100 may be executed in accordance with various techniques, which may be applied cumulatively or individually. Under a first technique, the transmitter (50, 150 or 250) transmits one or more pulses of the electromagnetic radiation. Under a second technique, the transmitter 250 coordinates the transmission time of pulses with other optical units in a common geographic zone to avoid interference. Under a third technique, the transmitter (50, 150 or 250) directs the transmitted electromagnetic radiation within a defined spatial zone, which comprises a field of regard. The field of regard is defined by a three-dimensional spatial zone extending in a direction of travel of the vehicle and having a height and width that is greater than the vehicle height and the vehicle width by a minimum spatial clearance. Under a fourth technique, the transmitter (50, 150 or 250) directs the transmitted electromagnetic radiation within a depth of a three-dimensional spatial zone. The three-dimensional spatial zone is defined by the at least one of the vehicular speed or velocity of the vehicle, minimum vehicle stopping distance plus a safety interval corresponding to the vehicular speed, maximum oncoming speed of oncoming objects, sampling rates of the collection of the image, and resolution of the image. Under a fifth technique, the transmitter (50, 150 or 250) emits a first group of generally linear beams from a first transmitter module and emits a second group of generally linear beams from a second transmitter module spaced apart from the first transmitter module. The first transmitter module and the second transmitter module may be spaced apart by a vertical dimension where the generally linear beams are substantially horizontally oriented or spaced apart by a horizontal dimension where the generally linear beams are substantially vertically oriented. In general, the first transmitter module and the second transmitter module may be aligned in a generally linear array, which has an array axis oriented approximately ninety degrees from the longitudinal axis of the generally linear beams transmitted.

In step S102, a receiver (e.g., 34 or 134) collects one or more images of the defined spatial zone. In one example, the defined spatial zone includes at least the field of regard. The receiver (34 or 134) or camera 18 has a field of view that meets or exceeds the field of regard in spatial scope.

In one embodiment, step S102 may be executed to collect multiple images (e.g., including first image data and second image data) of a defined spatial zone. For example, a controller 54 instructs the receiver 34 to collect a first image data of an image when a pulse of the electromagnetic radiation is not emitted or transmitted by the transmitter 50 (or by a particular transmitter module 30), and a second image data of substantially the same image when a pulse of the electromagnetic radiation is emitted or transmitted by the transmitter 50 (or by a particular transmitter module 30). The first image data and the second image data are taken from substantially the same position (e.g., x, y and z coordinates) or the first image data and the second image data are registered by determining the change in displacement (e.g., expressed as a vector or multidimensional quantity) between the first coordinates of the vehicle associated with the first image data and the second coordinates of the vehicle associated with the second image data. In an alternate embodiment, a location-determining receiver (e.g., Global Positioning System receiver with differential correction)(not shown) may be co-located with the obstacle detection system and the vehicle to provide the first coordinates, the second coordinates, or the relative displacement between the first and second coordinates. The data processor 20 subtracts the registered first image data from the second image data to derive the image (e.g., observed illumination radiation pattern or reflection on the object) to compensate for variation in illumination of at least one of the image and the object 16 (or obstacle).

In step S104, a data processor 20 detects a presence of an object 16 or obstacle in the collected image and in the defined spatial zone based on an observed illumination radiation pattern on an object 16 formed by at least one of the generally linear beams. For example, if no object is present in the defined spatial zone (or some defined portion thereof), none of the transmitted linear beams are reflected or form an illumination radiation pattern on the object 16. Instead, the transmitted linear beams propagate through space until they attenuate or reach an obstacle outside of the defined spatial zone. However, if an object is present in the define spatial zone, one or more of the transmitted linear beams are reflected or form an illumination radiation on the object 16. For example, if a short object is present in a first zone within the defined spatial zone, only lower linear beams form an illumination radiation pattern on the short object, whereas if a taller object is present in the first zone, both lower, middle and upper linear beams form an illumination radiation pattern on the taller object. If the horizontal length of the transmitted linear beams exceed the object width or dimension and if the coverage of beams exceeds a height of the object, the dimensions in image space or color space may be estimated. The spacing between the transmitted linear beams is proportional to the smallest detectable object, which may be significant for avoiding small flying objects or projectiles.

In step S106, a data processor 20 or distance estimator 22 estimates a distance between the object 16 and the optical device based on an observed material change (e.g., shift in one or more relative positions or relative heights) of generally linear beams from the transmitted radiation pattern to the observed illumination radiation pattern. In step S106, the distance may be estimated in accordance with various techniques that may be applied alternately or cumulatively.

Under a first technique, the distance estimator 22 estimates the distance by determining a reference illumination radiation pattern resulting from the transmitted radiation pattern being incident on a planar obstruction at a known fixed distance; and by determining a distance based on an observed shift between the reference illumination radiation pattern and the observed illumination radiation pattern.

Under a second technique, the estimating of a distance in step S106 is applied to a first zone from the obstacle detection system 11 mounted on a vehicle. The first zone begins at a first distance (or first radius) spaced apart from the vehicle and extending to a second distance (or second radius) spaced apart from the first distance.

Under a third technique, the material change between the transmitted radiation pattern and the illumination radiation pattern represents a shift in the relative spacing or relative height of the linear beams of the illumination pattern. If the transmission angle between adjacent beams is fixed and if the linear beams of the illumination radiation pattern are closer together than those of the reference object located further away, the object 16 is closer than the reference object. Conversely, if the transmission angle between adjacent beams is fixed and if the linear beams of the illumination radiation pattern are farther apart than those of a closer reference object, the object 16 is farther away than the reference object. In one embodiment, the image data on adjacent beam spacing is proportional to the real world beam spacing dimensions that may be determined (1) by defining the optical characteristics of the receiver (34 or 134), (2) by empirical measurements of the obstacle detection system, or (3) by field measurements of the obstacle detection system 11. Further, the relationship between (1) relative spacing of linear beams in the transmitted radiation pattern and the illumination radiation pattern and (2) the distance between the obstacle detection system and the object 16 may be empirically determined or experimentally measured and stored as a look-up table, a relational database, a file, tabular information or otherwise in data storage (e.g., memory) associated with the data processor 20 for future reference.

Under a fourth technique, the transmission angle ($\theta$) of the generally linear beam with respect to the horizontal plane is known; the transmission height ($H_T$) of the transmitter module 30 is known, the reception height ($H_R$) of the receiver (34 or 134) or lens of the camera 18 is known; the image data (e.g., bitmap or color space) spacing ($S_I$) between adjacent linear beams is measured from the illumination radiation pattern; and the real world spacing ($S_R$) between the adjacent linear beams is derived from the image data spacing based on experimental measurements, empirical data, optical characteristics of the receiver (34 or 134) or otherwise. The data processor 20 or the distance estimator 22 estimates the distance of the object from the obstacle based on a trigonometric equation that considers one or more of the following: the transmission angle ($\theta$), the transmission height ($H_T$), the reception height ($H_R$), image data spacing between lines of the illumination radiation pattern ($S_I$), real world spacing ($S_R$) between lines of the illumination radiation pattern. For example, distance (d) between the obstacle detection system and the object may be determined in accordance with the following equation:

$d = h / \tan \theta$, where d is the distance, $\theta$ is the transmission angle measured from a generally horizontal axis, and h is an observed height ($H_O$) of the illumination on The object less the reception height ($H_R$) (e.g., mounting height) of the camera or receiver. Alternatively, h is estimated as one-half of the real world spacing ($S_R$).

In an alternate embodiment, the method of FIG. 4 relates to the operation of a primary obstacle detection procedure that may be supplemented by supplemental obstacle detection procedures including one or more of the following. Under a first supplemental procedure, an auxiliary or secondary obstacle detection procedure detects an obstacle via a transmission of an ultrasonic signal and a receipt of a reflection in a near range closer than the first zone. Under a second procedure, an auxiliary or tertiary obstacle detection procedure generates a radiation pattern (e.g., optical energy or laser light) in a generally planar vertical "virtual wall" extending from at least one side of the vehicle to determine spatial constraints during turning of the vehicle.

Figure 5:
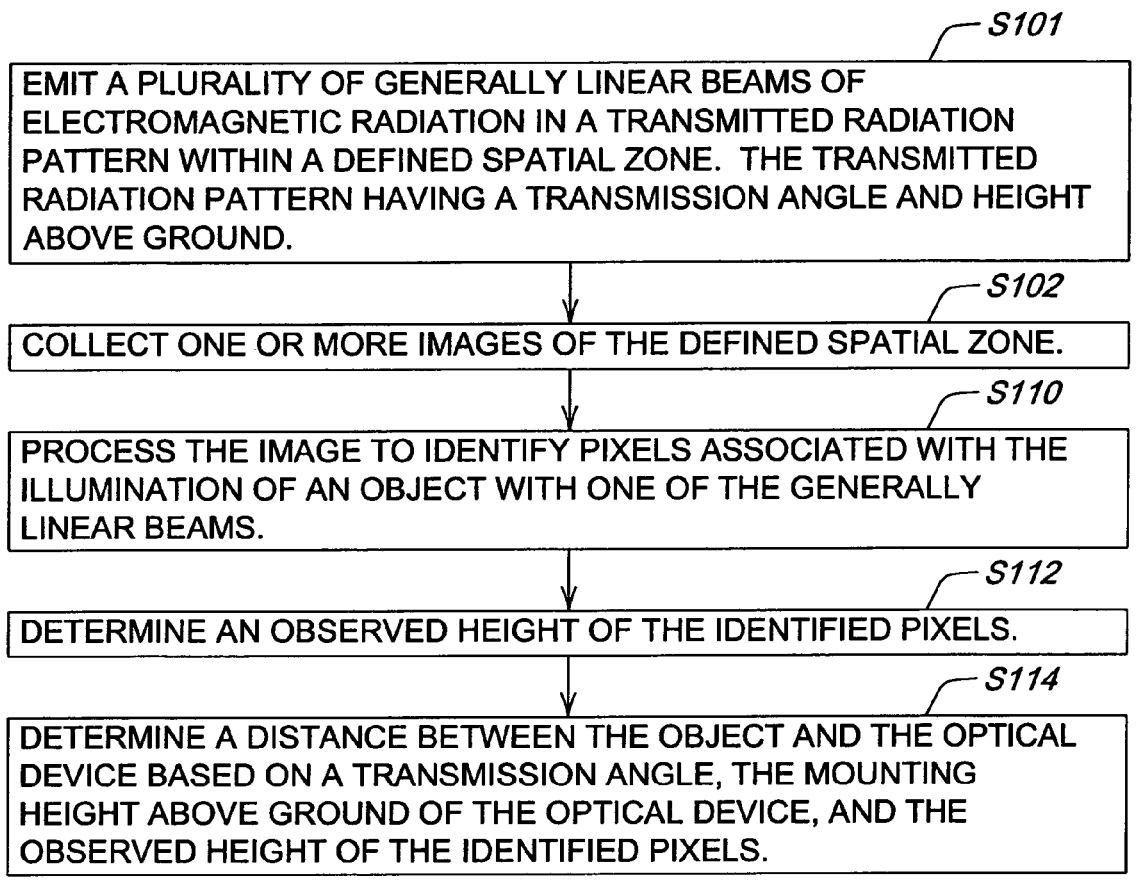
FIG. 5 is a flow chart of another embodiment of a method for detecting an obstacle.

FIG. 5 is a block diagram of a method for detecting an obstacle. The method of FIG. 5 begins in step S101.

In step S101, a transmitter 50 emits a plurality of generally linear beams of electromagnetic radiation in a transmitted radiation pattern within a defined spatial zone. The electromagnetic radiation may be transmitted over a certain frequency range, such as visible light, a portion of the visible light spectrum, infra-red light, a portion of the infra-red light spectrum, ultraviolet light, a portion of the ultra-violet light spectrum, or any combination of the foregoing frequency ranges. In step S101, the transmitted radiation pattern has a transmission angle (θ) with respect to a generally horizontal plane or axis and a height above ground.

Step S101 may be executed in accordance with various techniques, which may be applied cumulatively or individually. Under a first technique, the transmitter (50, 150, or 250) transmits one or more pulses of the electromagnetic radiation. Under a second technique, the transmitter 250 coordinates the transmission time of pulses with other optical units in a common geographic zone to avoid interference. Under a third technique, the transmitter (50, 150 or 250) directs the transmitted electromagnetic radiation within a defined spatial zone, which comprises a field of regard. The field of regard is defined by a three-dimensional spatial zone extending in a direction of travel of the vehicle and having a height and width that is greater than the vehicle height and the vehicle width by a minimum spatial clearance. Under a fourth technique, the transmitter (50, 150 or 250) directs the transmitted electromagnetic radiation within a depth of the three-dimensional spatial zone. The three-dimensional spatial zone is defined by the at least one of the vehicular speed or velocity of the vehicle, minimum vehicle stopping distance plus a safety interval corresponding to the vehicular speed, maximum oncoming speed of oncoming objects, sampling rates of the collection of the image, and resolution of the image. Under a fifth technique, the transmitter (50, 150 or 250) emits a first group of generally linear beams from a first transmitter module and emits a second group of generally linear beams from a second transmitter module spaced apart from the first transmitter module.

In step S102, the receiver 34 collects one or more images of the defined spatial zone. The collection of the image may comprise filtering of the image to attenuate signals outside a frequency range. In one embodiment, step S102 may be executed to collect multiple images (e.g., including first image data and second image data) of a defined spatial zone. For example, a controller 54 instructs the receiver 34 to collect a first image data of an image when a pulse of the electromagnetic radiation is not emitted or transmitted by the transmitter 50 (or by a particular transmitter module 30), and a second image data of substantially the same image when a pulse of the electromagnetic radiation is emitted or transmitted by the transmitter 50 (or by a particular transmitter module 30). The first image data and the second image data are taken from substantially the same position (e.g., x, y and z coordinates) or the first image data and the second image data are registered by determining the change is displacement (e.g., expressed as a vector or multidimensional quantity) between the first coordinates of the vehicle associated with the first image data and the second coordinates of the vehicle associated with the second image data. In an alternate embodiment, a location-determining receiver (e.g., Global Positioning System receiver with differential correction)(not shown) may be co-located with the obstacle detection system and the vehicle to provide the first coordinates, the second coordinates, or the relative displacement between the first and second coordinates. The data processor 20 subtracts the registered first image data from the second image data to derive the image (e.g., an observed illumination radiation pattern or reflection associated with the object 16) to compensate for variation in illumination of at least one of the image and the object 16 (or obstacle).

In step S110, the data processor 20 processes the image to identify pixels associated with the illumination of the object 16 with one or the generally linear beams.

In step S112, the data processor 20 determines an observed height of the identified pixels. Once the observed height of the pixels are determined in the image data (e.g., in the bitmap or in color space), the observed height of the pixels may be scaled to a real world or actual height of the corresponding points on the object with reference to the optical characteristics of the camera 18, test measurements, or empirical measurements or studies. In one embodiment, the determination of the observed height comprises determining the real world height of one or more points on the object 16 at which the radiation pattern strikes the object 16, where the points correspond to the pixel locations or coordinates.

In step S114, the distance estimator 22 determines a distance between the object 16 and the obstacle detection device (e.g., 11, 111 or 211) based on one or more of the following factors: (1) transmission angle (θ) of the generally linear beam with respect to a horizontal plane or axis, (2) the transmission height ($H_T$) of the transmitter module 30, (3) the reception height ($H_R$) of the receiver (34 or 134) or lens of the camera 18, (4) the transmission coordinates of the transmitter module 30, (5) the reception coordinates of the receiver (34 or 134) or lens of the camera 18, (6) the observed height of the identified pixels, (7) the observed height (e.g., real world height) of the points on the object 16 corresponding to the identified pixels, (8) the image data (e.g., bitmap or color space) spacing ($S_I$) between adjacent linear beams is measured from the illumination radiation pattern; and (9) the real world spacing ($S_R$) between the adjacent linear beams is derived from the image data spacing based on experimental measurements, empirical data, optical characteristics of the receiver (34 or 134) or otherwise. In accordance with one illustrative example of carrying out step S114, the data processor 20 or the distance estimator 22 estimates the distance of the object from the obstacle based on a trigonometric equation that considers one or more of the above factors. For example, distance (d) between the obstacle detection system and the object may be determined in accordance with the following equation:

d=h/tan θ, where d is the distance, θ is the transmission angle measured from a generally horizontal axis, and h is an observed height ($H_O$) of the illumination on the object less the reception height ($H_R$) (e.g.. mounting height) of the camera or receiver. Alternatively, h is estimated as one-half of the real world spacing ($S_R$).

In the design or configuration of the obstacle detection system (11, 111, or 211), transmission angle (θ) may be selected in accordance with various techniques, that may be applied separately or cumulative. Under a first technique, the transmission angle is determined in conformity with minimum vehicle stopping distance plus a safety interval. Under a second technique, the transmission angle is determined in conformity with one or more of the following: distance related to the maximum expected speed of any oncoming mobile objects, sampling rate of the collection of data, and resolution requirements.

FIG. 6A shows the side view of a mobile vehicle 38 equipped with an obstacle detection system (11, 111 or 211 of FIG. 1, FIG. 2, or FIG. 3). As illustrated, the mobile vehicle 38 has three transmitter modules 30, including a first transmitter module 31, a second transmitter module 33, and a third transmitter module 35. The first transmitter module 31 is separated from the second transmitter module 33 by a known (e.g., fixed vertical) distance; the second transmitter module 33 is separated from the third transmitter module 35 by a known (e.g., fixed vertical) distance.

As used herein, field of regard refers to a three dimensional volume in the direction of travel of a vehicle. The field of regard in a linear direction is defined spatially to be a window that is at least the width and the height (e.g., or another maximum transverse cross-section dimension) of the vehicle, each extended by a clearance safety factor. The depth or distance (which is designated $d_{near}$ (40)) of the window forming the volumetric field of regard is defined by the vehicle stopping distance (e.g., minimum stopping distance or worst case stopping distance) plus a safety interval. On level terrain with a defined surface, the minimum vehicle stopping distance or worst case stopping distance depends upon at least the instantaneous speed and acceleration of the vehicle, unless a maximum speed and acceleration are assumed. The depth or distance (which is designated dfar (42)) is related to the maximum expected speed (or actual detected speed) of any oncoming mobile objects 16, the sampling rate of the obstacle detection system (e.g., 11, 111 or 211), the resolutions of the obstacle detection system, or any combination of the foregoing items.

In the illustrative example of FIG. 6A, a wall, fence, building side, or other vertical planar surface 355 is located a distance $d_{far}$ (42) from a front side of the mobile vehicle 38. The aggregate radiation pattern 44 is used to detect an obstacle within a range or first zone from $d_{near}$ (40) to $d_{far}$ (42). However, if an obstacle is located between the vehicle and $d_{near}$ (40), an auxiliary obstacle detector is used to detect the obstacle. For example, an ultrasonic obstacle detector may be used to detect an obstacle located in a second zone between the vehicle and $d_{near}$ (40).

The transmitter modules 30 transmit an aggregate radiation pattern 44 that is composed of a first linear beam 91, a second linear beam 93, a third linear beam 95, a fourth linear beam 97, a fifth linear beam 98 and a sixth linear beam 99. Although six linear beams (91, 93, 95, 97, 98, and 99) are illustrated in FIG. 6A, it is understood that any number of linear beams may fall within the scope of the invention and that the actual number of linear beams may depend upon factors such as the smallest obstacle size to be detected, for example. In one embodiment, each linear beam has a transmission angle (θ) with respect to a horizontal plane or axis. However, in alternative embodiments the transmission angle of each linear beam may differ. In FIG. 6A, a primary beam pair 361 comprises a first linear beam 91 and a fourth linear beam 97; a secondary beam pair 359 comprises a second linear beam 93 and fifth linear beam 98, and a tertiary beam pair 357 comprises a third linear beam 95 and sixth linear beam 99. The primary beam pair 361 emanates from a common transmitter module 30; the secondary beam pair 359 originates from another common transmitter module 30, and the tertiary beam pair 357 emanates from yet another common transmitter module 30.

FIG. 6B shows a reference illumination radiation pattern or first illumination radiation pattern that occurs when the transmitter (50, 150 or 250) transmits electromagnetic radiation that is incident upon a planar surface 355 spaced apart from the vehicle by $d_{far}$ (42). Like reference numbers in FIG. 6A and FIG. 6B indicate like elements. The first linear beam 91, the second linear beam 93, the third linear beam 95, the fourth linear beam 97, the fifth linear beam 98 and the sixth linear beam 99 are shown as projected onto and looking toward the substantially planar surface 355 from the frontward-facing perspective of the vehicle 38.

Figure 6C:
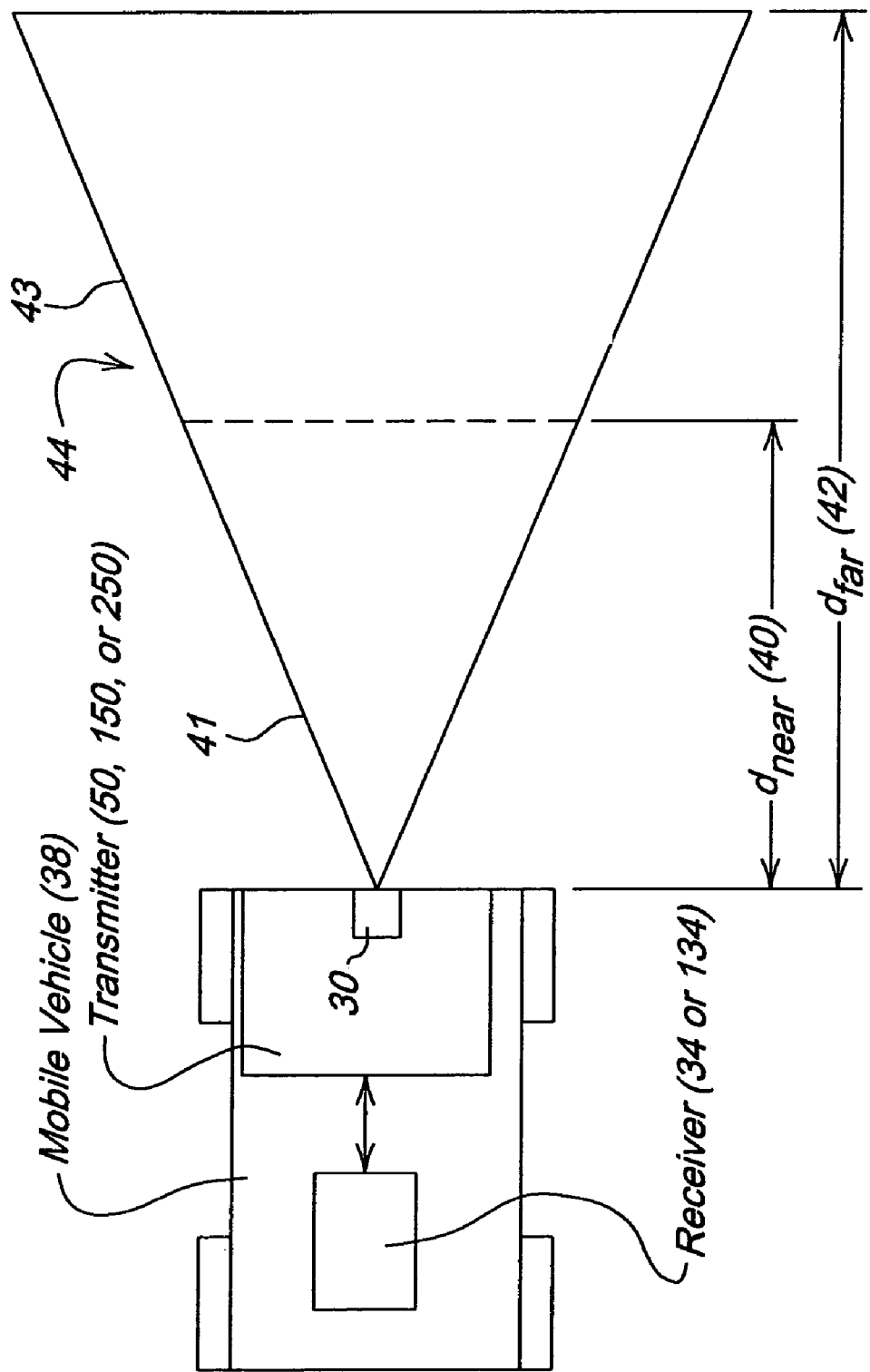
FIG. 6C is a top view of the work vehicle and includes a horizontal plane view of the radiation pattern of FIG. 6A.

FIG. 6C shows a top view of the radiation pattern 44 of FIG. 6A in a horizontal plane. The radiation pattern 44 is associated with the primary obstacle detection procedure, consistent with any of the embodiments of FIG. 1 through FIG. 5, inclusive. The primary radiation pattern associated with the primary obstacle detector extends from $d_{near}$ (40) to $d_{far}$ (42) in a first zone 43. The secondary radiation pattern associated with the secondary obstacle detector (e.g., ultrasonic obstacle detector) extends from the vehicle to $d_{near}$ (40) in a second zone 41.

The diagram of FIG. 7A is similar to the diagram of FIG. 6A, except the diagram of FIG. 7A further includes an obstacle or object 116 (e.g., person on a scooter or skateboard) between $d_{near}$ (40) and $d_{far}$ (42). The illumination radiation pattern 144 is obstructed by the object 116 where the transmitted electromagnetic radiation or light strikes the object 116. Accordingly, the transmitted electromagnetic radiation 144 comprises a first obstructed linear beam 191, a second obstructed linear beam 193, a third obstructed linear beam 195, a fourth obstructed linear beam 197, a fifth obstructed linear beam 198, and a sixth obstructed linear beam 99. The first obstructed linear beam 191 corresponds to the first linear beam 91; the second obstructed linear beam 193 corresponds to the second linear beam 93; the third obstructed linear beam 195 corresponds to the third linear beam 95; the fourth obstructed linear beam 197 corresponds to the fourth linear beam 97; the fifth obstructed linear beam 198 corresponds to the fifth linear beam 98; and the sixth obstructed linear beam 199 corresponds to the sixth linear beam 99. An obstructed primary beam pair 461 is composed of obstructed linear beams (191 and 197); an obstructed secondary beam pair 459 is composed of obstructed linear beams (193 and 198); a obstructed tertiary beam pair 457 is composted of obstructed linear beams (195 and 199). The obstructed linear beams (191, 193, 195, 197, 198, and 199) interact with or reflect from the object 116 to form an illumination radiation pattern.

FIG. 7B shows an observed illumination radiation pattern or a second illumination radiation pattern that occurs when the transmitter 50 transmits electromagnetic radiation 144 that is incident upon the object 116 between $d_{near}$ (40) and $d_{far}$ (42). Like reference numbers in FIG. 7A and FIG. 7B indicate like elements.

The receiver 34 may receive the reference illumination radiation pattern or the data processor 20 may reference the reference illumination radiation pattern in data storage (e.g., memory). The receiver 34 receives the observed illumination radiation pattern. The data processor 20 may compare the reference illumination radiation pattern to the observed illumination radiation pattern to determine if a shift or change in the radiation pattern has occurred. The extent of the change or shift indicates the relative position or distance of the obstacle with respect to the vehicle.

FIG. 8A and FIG. 8B show a side-by-side comparison between the received illumination radiation patterns of FIG. 6B and FIG. 7B. Like reference numbers in FIG. 6A through FIG. 8B, inclusive, indicate like elements. If the reference illumination radiation pattern of FIG. 8A is established based on a substantially planar surface 355 spaced apart from the vehicle by $d_{far}$, the object 116 associated with the observed illumination radiation pattern of FIG. 8B is closer than $d_{far}$ to the vehicle 38 because the line spacing of the observed illumination radiation pattern is lesser than that of the radiation pattern of FIG. 8A, for corresponding beam pairs. For example, the obstructed linear beams (191 and 197) of obstructed primary beam pair 461 of FIG. 8B are closer together than in the corresponding linear beams (91 and 97) of the primary beam pair 361 of FIG. 8A. Similarly, the obstructed linear beams (193 and 198) of obstructed secondary beam pair 459 of FIG. 8B are closer together than in the corresponding linear beams (93 and 98) of the secondary beam pair 359 of FIG. 8A. The degree of shift between the position of the primary beam pair 361 and the obstructed primary beam pair 461 may provide an indication of the distance of the object 116, if the distance between the vehicle and the planar surface 355 is known or if $d_{far}$ is known. The degree of shift between the position of the secondary beam pair 359 and the obstructed secondary beam pair 459 may provide an indication of the distance of the object 116, if the distance between the vehicle and the planar surface 355 is known or if $d_{far}$ is known.

Figure 9:
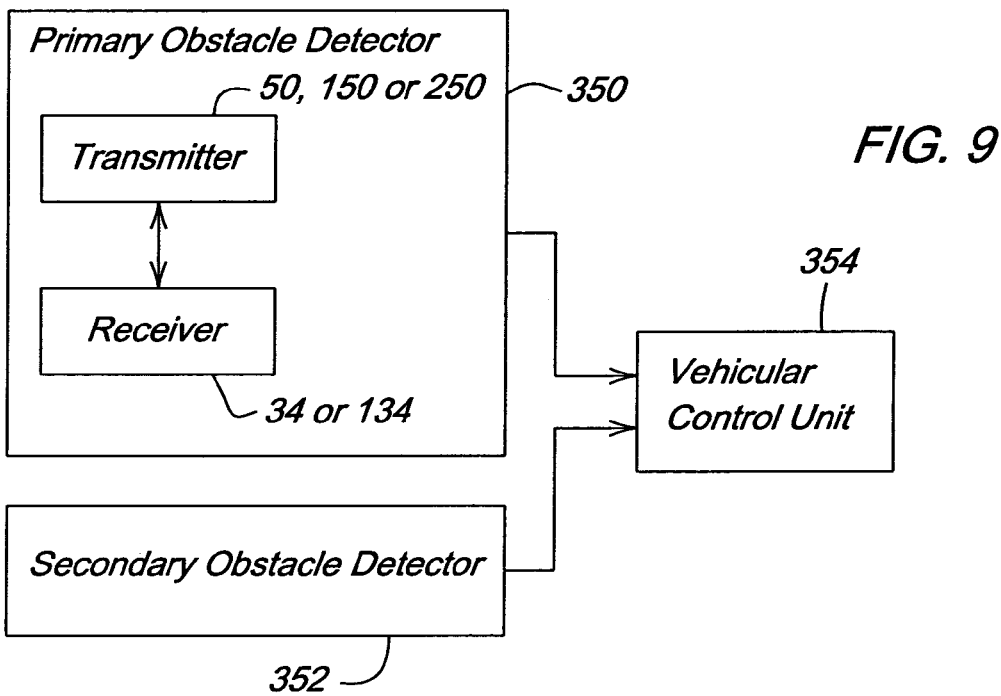
FIG. 9 is a block diagram of an obstacle detection system that comprises a primary obstacle detector and a secondary obstacle detector.

FIG. 9 is a block diagram of a obstacle detection system comprising a primary obstacle detector 350 and a secondary obstacle detector 352 that are coupled to a vehicular control unit 354. The primary obstacle detector 350 is consistent with the obstacle detection system in FIG. 1 or FIG. 2. Like reference numbers in FIG. 1, FIG. 2 and FIG. 9 indicate like elements.

The primary obstacle detector 350 and the secondary obstacle detector 352 are coupled to a vehicle control unit 354 for communications therewith. The secondary obstacle detector 352 may supplement or complement the primary obstacle detector 350. For example, the primary obstacle detector 350 may have a different coverage pattern or coverage range with the respect to the vehicle (or a different electromagnetic frequency range), than the secondary obstacle detector 352. In on illustrative configuration, the primary obstacle detector 350 is based on an optical obstacle detection system of FIG. 1, FIG. 2, or FIG. 3 and covers an area between $d_{near}$ (40) and $d_{far}$ (42), whereas the secondary obstacle detector 352 is based on an ultrasonic obstacle detection scheme and covers an area between the vehicle and $d_{near}$ (40).

The secondary obstacle detector 352 may comprise an ultrasonic acoustic sensor. Ultrasonic acoustic sensors generally have a wide beamwidth and are susceptible to multipath reflections, such that the secondary obstacle detection is most effective in a first zone from the vehicle to $d_{near}$ (40). Ultrasonic sensors are well suited for identifying or resolving negative obstacles. In one embodiment, the secondary obstacle detector 352 has a maximum range of approximately $d_{near}$ (40). Suitable ultrasonic sensors are manufactured and available through Polaroid Corporation of Waltham, Mass.

Figure 10:
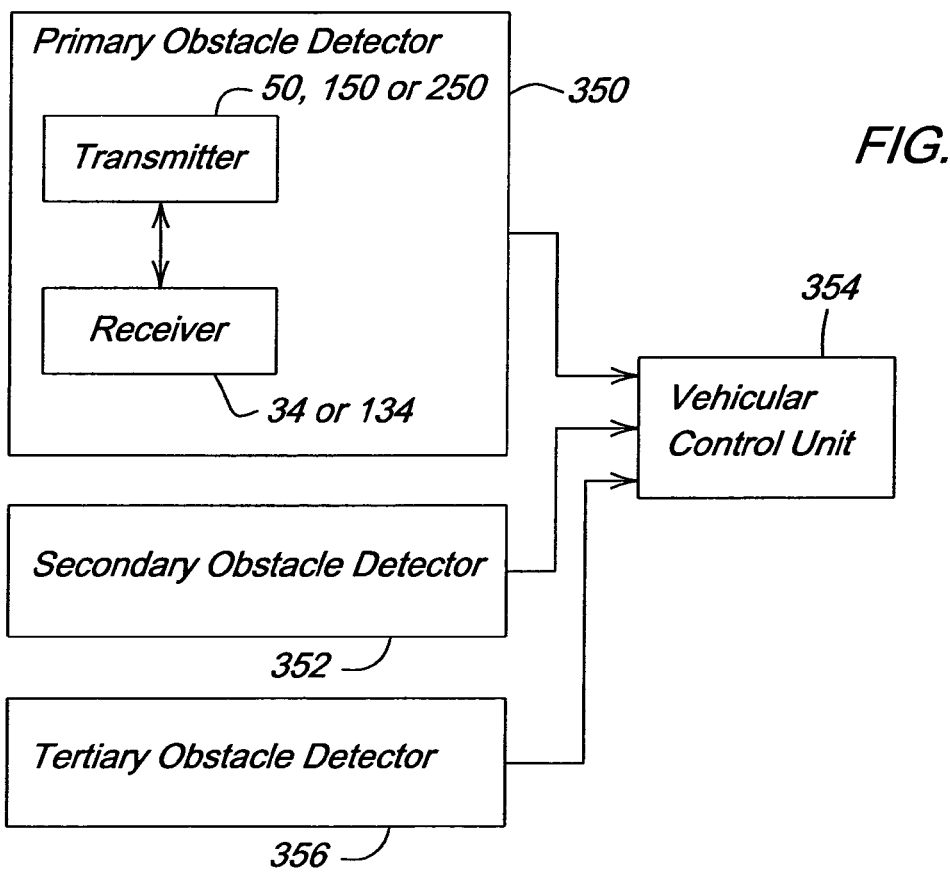

The obstacle detection system of FIG. 10 is similar to the obstacle detection system of FIG. 9, except the obstacle detection system of FIG. 10 further includes a tertiary obstacle detector 356. Like reference numbers in FIG. 9 and FIG. 10, indicate like elements. In one embodiment, the tertiary obstacle detector 356 has a different coverage pattern or coverage range with respect to the vehicle, than the primary obstacle detector 350 and the secondary obstacle detector 352. For example, the tertiary obstacle detector 356 may comprise a flare-side obstacle detector that forms a generally vertical radiation pattern extending from a side of the vehicle 38. The generally vertical radiation pattern is transmitted backwards from two opposite sides of the vehicle 38, at a side angle. The side angle and the generally vertical radiation pattern are selected to assist the vehicle in maneuvering and making turns without striking or contacting obstacles on an inner radius or outer radius during the turn.

In one illustrative example, the tertiary obstacle detector 356 creates a radiation pattern that comprises a generally vertical radiation pattern (e.g., a virtual optical wall) that is projected vertically to the ground and is associated with a camera 18 to detect perturbations in the generally vertical radiation pattern, indicating the presence of an obstacle. The tertiary obstacle detector 356 is well-suited for detecting an obstacle where the vehicle turns and the area when the turn occurs has not been recently observed by forward looking sensors or data collection devices.

Figure 11:
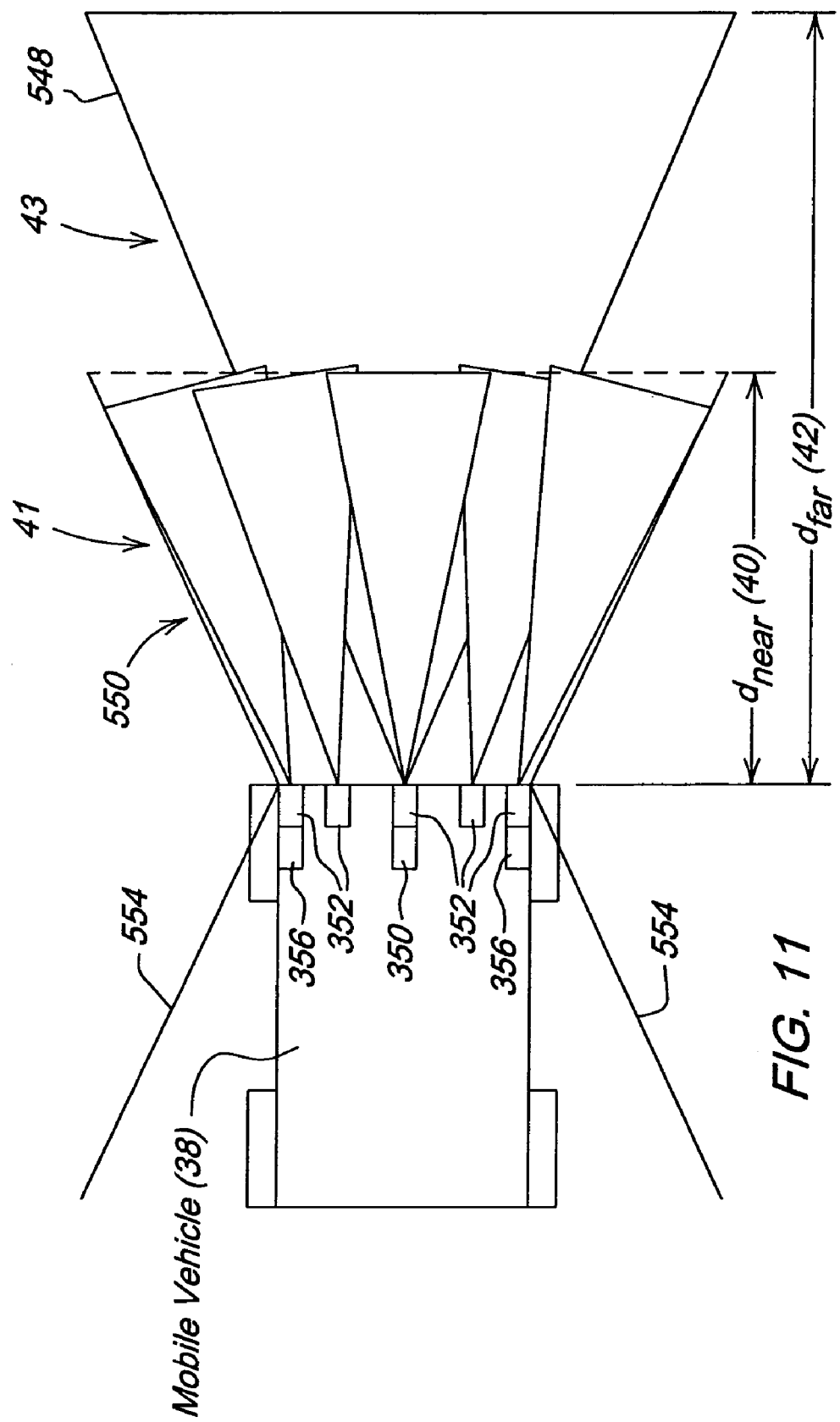
FIG. 11 is a block diagram of an obstacle detection system that comprises a primary obstacle detector, a secondary obstacle detector, and a tertiary obstacle detector.

FIG. 11 shows a top view of the radiation patterns associated with the primary obstacle detector 350, the secondary obstacle detector 352, and a tertiary obstacle detector 356. Like reference number in FIG. 9 and FIG. 11 indicate like elements.

The first radiation pattern 548 is associated with the primary obstacle detector 350 and extends from $d_{near}$ (40) to $d_{far}$ (42) in a first zone 43. The second radiation pattern 550 is associated with the secondary obstacle detector 352 and extends from the vehicle to $d_{near}$ (40) in a second zone 41. The third radiation pattern 554 associated with the tertiary obstacle detector 356 extends backwards from each side of the vehicle 38.

The first radiation pattern 548 in the first zone 43 of FIG. 10 is substantially the same as the radiation pattern of the first zone 43 of FIG. 6C. The first radiation pattern 548 is formed from multiple emission sources of the primary obstacle detector 350. Accordingly, multiple individual radiation patterns of transmitter modules 30 form an overall radiation pattern or first radiation pattern 548 for the first zone 43.

The secondary obstacle detector 352 has a second radiation pattern 550 in a second zone 41. The second radiation pattern 550 is an aggregate of multiple secondary obstacle detectors 352. The tertiary obstacle detector 356 produces a third radiation pattern 554 from each side of the vehicle.

Although a single camera 18 was used in each receiver 34 referenced herein, in alternate embodiments multiple cameras may be used. Multiple cameras may support redundancy and stereo image processing, for example.

The vehicle may comprise a small robot for in-building or exterior use. Although any dimensions may apply to the invention and fall within its scope, in an illustrative example the vehicle is 1 m long, 1 m high, and 0.5 meters long; $d_{near}$ (40) and $d_{far}$ (42) are set at 2 meters and 4 meters, respectively; and detectable obstacle size is 0.01 meters. The transmitter 50 may not rely upon moving parts to attain robustness and reliability over prior art designs. Other obstacle detection technologies such as stereo vision and ultrasonics may be used to augment other obstacle detection procedure or technology, and for redundant obstacle detection.

Having described the preferred embodiment, it will become apparent that various modifications can be made without departing from the scope of the invention as defined in the accompanying claims.

What is claimed is:

1. A method for detecting a presence of an object or the distance of the object from an optical device, the method comprising:

emitting simultaneously a plurality of generally linear beams, where each linear beam comprises a generally spatially continuous line segment of electromagnetic radiation with a transmitted radiation pattern within a defined spatial zone;

collecting an image of the defined spatial zone;

detecting a presence of an object in the collected image based on an observed illumination radiation pattern on an object formed by at least one of the generally linear beams;

estimating a distance between the object and the optical device based on an observed change in one or more positions of the generally linear beams from the transmitted radiation pattern to the observed illumination radiation pattern; the estimating of the distance is applied to a first zone from the optical device mounted on a vehicle, the first zone beginning at a first distance spaced apart from the vehicle and extending to a second distance spaced apart from the first distance; and detecting whether an obstacle is present in a second zone closer to the vehicle than the first zone via a transmission of an ultrasonic signal and a receipt of a reflection of the ultrasonic signal.

2. The method according to claim 1 further wherein the estimating of the distance comprises:

establishing a reference illumination radiation pattern resulting from the transmitted radiation pattern being incident on a generally planar surface at a known fixed distance; and determining a distance based on an observed change between the reference illumination radiation pattern and the observed illumination radiation pattern.

3. The method according to claim 1 wherein the generally linear radiation beams are substantially parallel to each other.

4. The method according to claim 1 wherein emitting comprises transmitting the electromagnetic radiation over a frequency range and wherein the collecting comprises filtering the image to attenuate signals outside the frequency range.

5. The method according to claim 1 wherein the emitting comprises transmitting one or more pulses of the electromagnetic radiation to increase human eye safety.

6. The method according to claim 1 wherein the collecting further comprises collecting first image data of an image when a pulse of the electromagnetic radiation is not emitted, and collecting a second image data of an image when a pulse of the electromagnetic radiation is emitted; and further comprising:

subtracting the first image data from the second image data to derive the image to compensate for variation in illumination of at least one of the image and the object.

7. The method according to claim 1 wherein the transmitting comprises coordinating the transmission time of pulses with other optical units in a common geographic zone to avoid interference.

8. The method according to claim 1 further comprising:

generating a radiation pattern in a generally planar vertical wall extending from at least one side of the vehicle to determine spatial constraints during turning of the vehicle.

9. The method according to claim 1 wherein the defined spatial zone comprises a field of regard comprising a three-dimensional spatial zone extending in a direction of travel of a vehicle and having a height and width that is greater than the vehicle height and the vehicle width by a minimum spatial clearance.

10. The method according to claim 9 the depth of the three-dimensional spatial zone is defined by the at least one of the vehicular speed or velocity of the vehicle, minimum vehicle stopping distance plus a safety interval corresponding to the vehicular speed, maximum oncoming speed of oncoming objects, sampling rates of the collection of the image, and resolution of the image.

11. The method according to claim 1 wherein the emitting comprises emitting a first group of generally linear beams from a first emission source and emitting a second group of generally linear beams from a second emission source spaced apart from the first emission source.

12. A method for measuring a distance between an optical device and an object, the method comprising:

emitting simultaneously a plurality of generally linear beams, where each linear beam comprises a generally spatially continuous line segment of electromagnetic radiation at a transmission angle and height above ground with a transmitted radiation pattern within a defined spatial zone;

collecting an image of the defined spatial zone; processing the image to identify pixels associated with the illumination of an object with one of the generally linear beams;

determining an observed height of the identified pixels; and determining a distance between the object and the optical device based on a transmission angle, the mounting height above ground of the optical device, and the observed height of the identified pixels, wherein the transmission angle is determined in conformity with minimum vehicle stopping distance plus a safety interval.

13. The method according to claim 12 wherein the determining of the observed height comprises the height of the object at which the radiation pattern strikes the object.

14. The method according to claim 12 wherein the determining of the distance is accomplished in accordance with the following equation:

$d = h/\tan \theta$, where d is the distance, $\theta$ is the transmission angle measured from a generally horizontal axis, and h is an observed height less the mounting height of the optical device.

15. The method according to claim 12 wherein the transmission angle is determined in conformity with one or more of the following: distance related to the maximum expected speed of any oncoming mobile objects, sampling rate of the collection of data, and resolution requirements.

16. The method according to claim 12 wherein emitting comprises transmitting the electromagnetic radiation over a frequency range and wherein the collecting comprises filtering the image to attenuate signals outside the frequency range.

17. The method according to claim 12 wherein the emitting comprises transmitting one or more pulses of the electromagnetic radiation to increase human eye safety.

18. The method according to claim 12 wherein the collecting further comprises collecting first image data of an image when a pulse of the electromagnetic radiation is not emitted, and collecting a second image data of an image when a pulse of the electromagnetic radiation is emitted; and further comprising:

subtracting the first image data from the second image data to derive the image to compensate for variation in illumination of at least one of the image and the object.

19. The method according to claim 12 wherein the transmitting comprises coordinating the transmission time of pulses with other optical units in a common geographic zone to avoid interference.

20. The method according to claim 12 wherein the defined spatial zone comprises a field of regard comprising a three-dimensional spatial zone extending in a direction of travel of a vehicle and having a height and width that is greater than the vehicle height and the vehicle width by a minimum spatial clearance.

21. The method according to claim 12 the depth of the three-dimensional spatial zone is defined by the at least one of the vehicular speed or velocity of the vehicle, minimum vehicle stopping distance plus a safety interval corresponding to the vehicular speed, maximum oncoming speed of oncoming objects, sampling rates of the collection of the image, and resolution of the image.

22. The method according to claim 12 wherein the emitting comprises emitting a first group of generally linear beams from a first transmitter module and emitting a second group of generally linear beams from a second transmitter module spaced apart from the first transmitter module.

23. An obstacle detection system for detecting the presence of an object or a distance of the object from the system, the obstacle detection system comprising:

a transmitter for emitting simultaneously a plurality of generally linear beams, where each linear beam comprises a generally spatially continuous line segment of electromagnetic radiation with a transmitted radiation pattern within a defined spatial zone, the transmitter arranged to emit the transmitted radiation pattern in a first zone spaced apart from the transmitter by a first distance or radius;

a camera for receiving a reflection of one or more of the linear beams from an object in the defined spatial zone;

a data processor for determining at least one of a presence of and a distance of the object from the optical device based on an observed shift in one or more positions of the generally linear beams observable in a detected pattern of the reflection; and a secondary obstacle detector for detecting an obstacle via a transmission of an ultrasonic signal and a receipt of a reflection in a second zone closer to the transmitter than the first zone.

24. The optical device according to claim 23 wherein the data processor is arranged to estimate a distance between the object and the optical device based on the observed shift in one or more positions of the generally linear beams from the transmitted radiation pattern to the observed illumination radiation pattern.

25. The system according to claim 23 further wherein the data processor establishes a reference illumination radiation pattern resulting from the transmitted radiation pattern being incident on a planar obstruction at a known fixed distance; and determines a distance based on an observed shift between the reference illumination radiation pattern and the observed illumination radiation pattern.

26. The system according to claim 23 wherein the generally linear radiation beams are substantially parallel to each other.

27. The system according to claim 23 wherein the transmitter, the camera, and the data processor are mounted on a vehicle; and further comprising:

a tertiary obstacle detector for generating a radiation pattern in a generally planar vertical wall extending from at least one side of a vehicle to determine spatial constraints during turning of the vehicle.

28. The system according to claim 23 wherein the defined spatial zone comprises a field of regard comprising a three-dimensional spatial zone extending in a direction of travel of a vehicle and having a height and width that is greater than the vehicle height and the vehicle width by a minimum spatial clearance.

29. The system according to claim 28 the depth of the three-dimensional spatial zone is defined by the at least one of the vehicular speed or velocity of the vehicle, minimum vehicle stopping distance plus a safety interval corresponding to the vehicular speed, maximum oncoming speed of oncoming objects, sampling rates of the collection of the image, and resolution of the image.

30. The system according to claim 23 wherein the transmitter comprises a first transmitter module for emitting a first group of generally linear beams, a second transmitter module for emitting a second group of generally linear beams, the second transmitter module spaced apart from the first transmitter module to form a generally linear array of the first transmitter module and the second transmitter module.

* * * * *